K. KNOTT.
PROCESS OF PRESERVING FOOD.

No. 178,446. Patented June 6, 1876.

WITNESSES:

INVENTOR:
Kennard Knott
BY

ATTORNEYS.

UNITED STATES PATENT OFFICE.

KENNARD KNOTT, OF CHICAGO, ILLINOIS.

IMPROVEMENT IN PROCESSES OF PRESERVING FOOD.

Specification forming part of Letters Patent No. 178,446, dated June 6, 1876; application filed March 17, 1876.

*To all whom it may concern:*

Be it known that I, KENNARD KNOTT, of Chicago, in the county of Cook and State of Illinois, have invented a new and Improved Sea-Going Meat and Flour Package; and I do hereby declare that the following is a full, clear, and exact description of the same.

So far as I am aware, no efficient and economical method of preserving fresh meat for use on ship-board has been devised and come into use. I have, however, discovered that it may be preserved indefinitely under the conditions of temperature and moisture to which a ship's cargo is ordinarily subjected, and even under more unfavorable conditions, by the following method and means.

Figure 1:
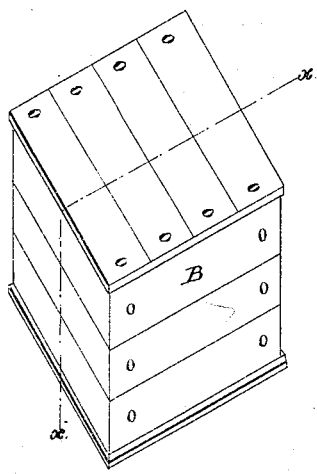
Figure 2:
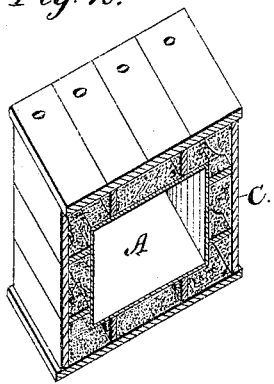

Referring to the drawing, forming part of this specification, Figure 1 is a perspective view of the packing-case, and Fig. 2 a vertical section.

The meat to be preserved is first deprived of its animal heat in a temperature considerably above the freezing-point, and then subjected to a temperature below that point until it is frozen solid. In this condition it is placed in a case, A, which is then closely sealed, both these operations (packing and sealing) being performed in the same temperature to which the meat was last subjected. The meat case or can A is placed in the center of the outer case B, made sufficiently large to leave a considerable space between them on all sides. This space is filled with densely-packed fine wheaten flour C, and the cover of the outer case then applied and secured.

The inner case A is preferably made of sheet metal, in order that it may be hermetically sealed. The outer case B may be of metal or wood, it being chiefly important that it shall be capable of retaining the flour packing. Flour of wheat or other cereals has special excellence as a non-conductor of heat, and meat may be preserved in it for a long period even without the necessity of first reducing it to a frozen condition. But when the meat is frozen and inclosed in a hermetically-sealed case, which is surrounded by a body of flour within a packing-box, as above described, it will be preserved for an indefinite period under all ordinary conditions incident to transit both by sea and land, or to storage in warehouses, packing-houses, &c. For use on ship-board the package has peculiar advantages, combining as it does both animal and vegetable food, such as is required for daily consumption, and the latter preserving the former till both are needed.

The packing-case A B is available for reuse for the same purpose, it being only necessary, in some instances, to provide a new cover for the inner case A. An economy is thus apparent over tierces in which salt meat is ordinarily packed for use at sea.

I do not restrict myself to packing meat in this manner, but include fish, and other substances used for food. In case fruit is to be preserved it is obvious that it would simply require to be packed in a cool atmosphere without being frozen.

My invention enables fresh meat to be kept constantly on hand for use by the navy or merchant service, also by the army in camp or actual service, and the means of preserving it to be utilized as part of the vegetable food required for daily consumption. In other words, meat and flour are shipped in one and the same package, in such relative proportions, by weight, as will be required under ordinary circumstances. The invention is also particularly valuable for shipping meat and flour from one country to another, for purposes of general consumption.

What I claim is—

1. The mode of preserving articles of food by packing them, when cool or frozen, in a hermetically-sealed can or vessel, and surrounding the said can or vessel by a body of flour contained within an outer case, the packing operation being conducted in an atmosphere whose temperature is the same, or as nearly as practicable the same, as that in which the articles have been cooled or frozen, as set forth.

2. The animal and vegetable food-package, formed of an outer case, B, an inner case, A, contained therein, an interposed filling of flour, and a piece of meat hermetically sealed in the said inner case, as shown and described.

KENNARD KNOTT.

Witnesses:
 AMOS W. HART,
 THEODORE S. WEST.